United States Patent [19]
Ando et al.

[11] Patent Number: 5,786,434
[45] Date of Patent: Jul. 28, 1998

[54] WATER-ABSORPTIVE SOFT CONTACT LENS MATERIAL AND CONTACT LENS MADE THEREOF

[75] Inventors: Ichiro Ando; Toru Kawaguchi, both of Nagoya; Shoji Ichinohe; Toshio Yamazaki, both of Gunma-ken, all of Japan

[73] Assignee: Menicon Co., Ltd., Aichi-ken, Japan

[21] Appl. No.: 709,691

[22] Filed: Sep. 10, 1996

[30] Foreign Application Priority Data

Sep. 12, 1995 [JP] Japan .................. 7-233771

[51] Int. Cl.⁶ .................. C08F 226/06; C08F 230/08; C08F 220/56; C08F 220/18
[52] U.S. Cl. .................. 526/264; 526/279; 526/303.1; 526/328.5; 526/347
[58] Field of Search .................. 526/279, 264, 526/303.1, 328.5, 347

[56] References Cited

U.S. PATENT DOCUMENTS

| | | | |
|---|---|---|---|
| 4,868,260 | 9/1989 | Kawaguchi | 526/242 |
| 5,023,305 | 6/1991 | Onozuka et al. | 526/194 |
| 5,250,583 | 10/1993 | Kawaguchi et al. | 523/107 |
| 5,374,662 | 12/1994 | Lai et al. | 522/172 |
| 5,391,591 | 2/1995 | Kawaguchi et al. | 526/279 |
| 5,539,016 | 7/1996 | Kunzler et al. | 523/107 |

*Primary Examiner*—Joseph L. Schofer
*Assistant Examiner*—Wu C. Cheng
*Attorney, Agent, or Firm*—Armstrong, Westerman, Hattori, McLeland & Naughton

[57] ABSTRACT

A water-absorptive soft contact lens material having a high transparency, an excellent flexibility, a high oxygen permeability independent of water content, a high mechanical strength and an adequate hardness, which comprises a copolymer prepared by the polymerization of a monomer mixture comprising an N,N-dialkyl acrylamide or methacrylamide, an N-vinyllactam and a bis(silicon-containing alkyl) fumarate in a specific ratio, and which provides water-absorptive soft contact lenses having excellent properties such as high transparency and high oxygen permeability.

17 Claims, No Drawings

WATER-ABSORPTIVE SOFT CONTACT LENS MATERIAL AND CONTACT LENS MADE THEREOF

BACKGROUND OF THE INVENTION

The present invention relates to a material suitable for the production of water-absorptive soft contact lenses and a water-absorptive soft contact lens made thereof, and more particularly to a water-absorptive soft contact lens material having an excellent oxygen permeability independent of water content, a high mechanical strength and an adequate hardness as well as excellent transparency and flexibility, and suitable for the production of high oxygen permeable soft contact lenses.

Polymers prepared from hydrophilic monomers such as N,N-dimethylacrylamide and N-vinylpyrrolidone have been conventionally used as materials for water-absorptive soft contact lenses from the viewpoint of high water content. These lens materials have an excellent flexibility, since they are usually hydrogels having a high water content. However, they are very fragile and, therefore, the mechanical strength is not sufficient for use as contact lenses.

In order to improve the mechanical strength of soft contact lenses made therefrom, it has been attempted to copolymerize the hydrophilic monomers with a proper amount of hydrophobic monomers or hydrophobic macromolecular monomers. However, the thus prepared copolymers are not so good in oxygen permeability and, therefore, a supply of oxygen required usually in wearing of contact lenses tends to become insufficient.

In general, water-absorptive soft contact lens materials themselves are not permeable to oxygen. Oxygen permeates the contact lenses through water included therein. As made clear, for instance, by Fatt and Ruben in Journal of the British Contact Lens Association, Vol. 17, [1], 11–18(1993), "Oxygen Permeability of Contact Lens Materials: A 1993 Update", it is known that the oxygen permeability of water-absorptive soft contact lens materials depends on the water content. Fatt et al indicate that the coefficient of oxygen permeability (Dk) of water content dependent-type soft contact lens materials is determined according to the equation:

$$Dk = 2.0 \times 10^{-11} \times exp(0.0411 \times \text{water content}) \ [(cm^2/sec) \cdot (ml\ O_2/ml \cdot mmHg)]$$

wherein the unit of water content is % by weight. It has been generally known that the maximum water content of lens materials which does not detrimentally damage the mechanical strength, is about 70 to 80% by weight. For instance, if the maximum water content is about 75% by weight, the oxygen permeability coefficient Dk is estimated to be about $44 \times 10^{-11}$ based on the above equation. However, the oxygen permeability on such a level is still insufficient if the safety of cornea is considered.

Like this, the water content of water-absorptive contant lens materials must be increased for raising the oxygen permeability thereof, but the mechanical strength decreases with increasing the water content. In contrast with this, water-absorptive contanct lens materials having a high mechanical strength are low in water content, thus the oxygen permeability is not high.

Thus, it has been attempted to use monomers capable of imparting an oxygen permeability to the resulting polymers in order to obtain lens materials which have an adequate water content, and which have an oxygen permeability capable of supplying a sufficient amount of oxygen to eye tissue as well as a high mechanical strength. Various soft contanct lens materials of this type have been proposed.

For instance, there are proposed, as such soft contact lens materials, a copolymer comprising as essential components a hydrophilic monomer, an organosiloxanyl (meth)acrylate and a fluorine-containing monomer (Japanese Patent Publication Kokai No. 3-179422), a copolymer comprising as essential components 2,3-dihydroxypropyl methacrylate, an organosiloxanyl methacrylate and a crosslinking agent (Japanese Patent Publication Kokai No. 3-196117 and No. 3-196118), and a copolymer comprising as essential components N-methyl-3-methylene-2-pyrrolidone and a silicon-containing (meth)acrylate and/or a fluoroalkyl (meth)acrylate (Japanese Patent Publication Kokai No. 6-214197). However, these lens materials still tend to depend on the water content in respect of oxygen permeability, and moreover, the oxygen permeability itself is not so excellent and, therefore, there is the possibility that a sufficient amount of oxygen is not supplied to eye tissue.

It is also proposed to use as a soft contact lens material a copolymer comprising as essential components an organosiloxanyl (meth)acrylate, a fluorine-containing monomer and a radical-polymerizable amido group-containing monomer (Japanese Patent Publication Kokai No. 3-294818). This lens material has indeed a high mechanical strength and a high oxygen permeability, but it has the disadvantage that the hardness becomes too high, since large amounts of organosiloxanyl (meth)acrylate and fluorine-containing monomer are used in order to raise the oxygen permeability, thus it does not have a flexibility as required in soft contact lenses.

A contact lens material having a flexibility suitable for use as water-absorptive soft contact lenses, and having a high oxygen permeability independent of the water content and, therefore, capable of having a high mechanical strength has not yet been proposed.

It is an object of the present invention to provide a water-absorptive soft contact lens material having an excellent oxygen permeability independent of the water content, a high mechanical strength and an adequate hardness, to say nothing of having excellent transparency and flexibility.

This and other objects of the present invention will become apparent from the description hereinafter.

SUMMARY OF THE INVENTION

In accordance with the present invention, there is provided a material suitable for the production of water-absorptive soft contact lenses comprising a copolymer prepared by the polymerization of a monomer mixture comprising (A) 15 to 40% by weight of an N,N-dialkyl acrylamide or methacrylamide, (B) 10 to 30% by weight of an N-vinyllactam, and (C) 30 to 70% by weight of a bis(silicon-containing alkyl) fumarate.

The lens material according to the present invention has an excellent oxygen permeability independent of water content, a high mechanical strength and an adequate hardness as well as excellent transparency and flexibility and, therefore, is very suitable for the production of high oxygen permeable water-absorptive soft contact lenses.

DETAILED DESCRIPTION

The water-absorptive soft contact lens material of the present invention is composed of a main component of a copolymer prepared by polymerizing a monomer mixture containing 15 to 40% by weight of the N,N-dialkyl (meth)

acrylamide (A), 10 to 30% by weight of the N-vinyllactam (B), and 30 to 70% by weight of the bis(silicon-containing alkyl) fumarate. The term "(meth)acrylamide" as used herein means acrylamide and methacrylamide.

It is essential to use at least these three components (A), (B) and (C) in the preparation of the copolymer. Since these components are used together, the obtained copolymer has excellent physical properties such as high transparency, high flexibility, high mechanical strength and high oxygen permeability independent of water content.

If it is attempted to copolymerize the N,N-dialkyl (meth) acrylate (A) which is a hydrophilic monomer, with only the bis(silicon-containing alkyl) fumarate (C) which is a hydrophobic monomer, e.g., bis[tris(trimethyl-siloxy)silylpropyl] fumarate which imparts a particularly excellent oxygen permeability among the fumarate compounds (C), turbidity occurs owing to emulsification when they are mixed, so a uniform transparent monomer mixture is not obtained. A transparent monomer mixture is once obtained by heating the mixture, for instance, to about 30° C., but the polymerization product obtained therefrom is still opaque.

Also, if it is attempted to copolymerize the N-vinyllactam (B) which is a hydrophilic monomer, with only bis[tris (trimethylsiloxy)silylpropyl] fumarate (C), a mixture thereof is uniform and transparent, but the polymerization product obtained therefrom is opaque like the case using the N,N-dialkyl (meth)acrylamide as the hydrophilic monomer.

As mentioned above, a transparent copolymer suitable as a contact lens material cannot be obtained from the use of either one of the hydrophilic monomers (A) and (B) with the bis(silicon-containing alkyl) fumarate (C), particularly bis [tris(trimethylsiloxy)silylpropyl] fumarate having an excellent oxygen permeability.

In contrast, when the above three components are used in specific proportions according to the present invention, probably a balance between two hydrophilic monomers and a balance between the hydrophilic monomers and the hydrophobic monomer become proper so as to raise the compatibility of these three components, thus a uniform and transparent monomer mixture is obtained and a copolymer having an excellent transparency and suitable for use in contact lenses is obtained by the polymerization of such a monomer mixture.

Also, since the thus obtained copolymer of the present invention has a proper water content which is based on the N,N-dialkyl (meth)acrylamide (A) and the N-vinyllactam (B), a high oxygen permeability and a high mechanical strength which are based on the bis(silicon-containing alkyl) fumarate (C), and a flexibility and an oxygen permeability independent of water content which are considered to be based on the well-balanced use of the three components in specific proportions, it provides water-absorptive soft contact lens materials and water-absorptive soft contact lenses satisfying all these properties as required for soft contact lenses.

The N,N-dialkyl (meth)acrylamide (A) serves to impart an adequate water content to the obtained water-absorptive soft contact lenses, as mentioned above.

Representative examples of the N,N-dialkyl (meth) acrylamide are, for instance, N,N-dimethyl-(meth) acrylamide, N,N-diethyl(meth)acrylamide, N,N-methylethyl(meth)acrylamide, N,N-methylpropyl(meth) acrylamide, and the like. The (meth)acrylamide monomers may be used alone or in admixture thereof. The number of carbon atoms of the alkyl groups is preferably from 1 to 3.

N,N-dimethyl(meth)acrylamide, particularly N,N-dimethylacrylamide, is preferred as the component (A), since they have a high hydrophilic property and can impart a sufficient flexibility to the obtained water-absorptive soft contact lenses and lens materials by hydration, and since they are representative wide use monomers and are easily available.

The N,N-dialkyl (meth)acrylamide (A) is used in an amount of at least 15% by weight, preferably at least 17% by weight, based on the total weight of the monomers used so as not to impair the flexibility owing to insufficient water content of the obtained water-absorptive soft contact lens material, and is used in an amount of at most 40% by weight, preferably at most 38% by weight, so as not to lower the mechanical strength of the obtained lens material.

The N-vinyllactam (B) used in the present invention serves to impart a flexibility and an adequate water content to the obtained water-absorptive contact lenses and lens materials as well as the component (A).

Representative examples of the N-vinyllactam (B) are, for instance, N-vinylpyrrolidone, N-vinyl-3-methylpyrrolidone, N-vinylcaprolactam, N-vinylpiperidone, and the like. N-vinylpyrrolidone is preferred as the component (B), since it has a high hydrophilic property and can provide a sufficient flexibility to the obtained copolymers and since it is a representative wide use monomer and is easily available. These compounds may be used alone or in admixture thereof.

The N-vinyllactam (B) is used in an amount of at least 10% by weight, preferably at least 12% by weight, based on the total weight of the monomers used so as not to impair the flexibility owing to insufficient water content of the obtained water-absorptive soft contact lens material, and is used in an amount of at most 30% by weight, preferably at most 28% by weight, based on the total weight of the monomers used so as not to lower the mechanical strength of the obtained lens material.

It is important to suitably adjust the proportion of the hydrophilic monomers, N,N-dialkyl (meth)acrylamide (A) and N-vinyllactam (B), in order to obtain transparent copolymers. It is preferable to adjust the component (A)/ component (B) ratio within the range of about 0.7 to about 1.6 by weight.

The bis(silicon-containing alkyl) fumarate (C) serves to impart a high oxygen permeability and a high mechanical strength to the obtained water-absorptive soft contact lens materials.

Representative bis(silicon-containing alkyl) fumarates (C) used in the present invention are, for instance, compounds of the formula (I):

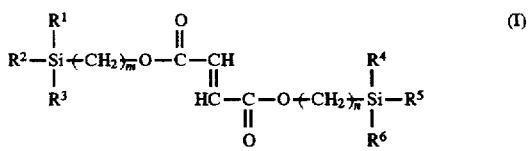

wherein $R^1$ to $R^6$ are independently methyl group or trimethylsiloxy group of the formula:

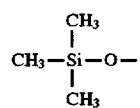

and m and n are independently an integer of 1 to 3.

Examples of the compounds of the formula (I) are, for instance, bis[3-(trimethylsilyl)propyl] fumarate, bis[3-

(pentamethyldisiloxanyl)propyl] fumarate, bis[3-(1,3,3,3-tetramethyl-1-trimethylsilyloxydisiloxanyl)-propyl] fumarate, bis[tris(trimethylsiloxy)silylpropyl] fumarate, and the like. These compounds may be used alone or in admixture thereof.

Bis[tris(trimethylsiloxy)silylpropyl] fumarate is particularly preferred as the component (C) from the viewpoint of a large effect of imparting an oxygen permeability.

The bis(silicon-containing alkyl) fumarate (C) is used in an amount of at least 30% by weight, preferably at least 35% by weight, based on the total weight of the monomers used, in order to sufficiently impart a high oxygen permeability and a high mechanical strength to the obtained water-absorptive soft contact lens material, and is used in an amount of at most 70% by weight, preferably at most 68% by weight, based on the total weight of the monomers used in order to prevent the obtained water-absorptive soft contact lens material from becoming too soft in the nonhydrated state and accordingly from encountering a difficulty in cutting processing to obtain soft contact lenses therefrom, and in order to prevent deterioration of the flexibility of the hydrated lens material.

The monomers (A), (B) and (C) which are used in specific proportions as mentioned above, may be copolymerized with other monomers, e.g., hydrophilic monomers and hydrophobic monomers, for the purpose of imparting a stain resistance to the obtained water-absorptive soft contact lens material, for the purpose of improving the cutting processability, or for other purposes.

Examples of the other monomers copolymerizable with the monomers (A), (B) and (C) are, for instance, an alkyl or fluoroalkyl (meth)acrylate such as methyl (meth)acrylate, ethyl (meth)acrylate, propyl (meth)acrylate, n-butyl (meth)acrylate, t-butyl (meth)acrylate, pentyl (meth)acrylate, benzyl (meth)acrylate, cyclohexyl (meth)acrylate, 2,2,2-trifluoroethyl (meth)acrylate, 2,2,3,3-tetrafluoropropyl (meth)acrylate, 2,2,3,4,4,4-hexafluorobutyl (meth)acrylate, 2,2,3,3,4,4-hexafluorobutyl (meth)acrylate, 2,2,2,2',2',2'-hexafluoroisopropyl (meth)acrylate, 2,2,3,3,4,4,4-heptafluorobutyl (meth)acrylate, 2,2,3,3,4,4,5,5-octafluoropentyl (meth)acrylate, 2,2,3,3,4,4,5,5,6,6,7,7-dodecafluoroheptyl (meth)acrylate, 3,3,4,4,5,5,6,6,7,7,8,8-dodecafluorooctyl (meth)acrylate, 3,3,4,4,5,5,6,6,7,7,8,8,8-tridecafluorooctyl (meth)acrylate or 3,3,4,4,5,5,6,6,7,7,8,8,9,9,10,10-hexadecafluorodecyl (meth)acrylate; a hydroxyalkyl (meth)acrylate such as 2-hydroxyethyl (meth)acrylate, 2-hydroxypropyl (meth)acrylate, hydroxybutyl (meth)acrylate, dihydroxypropyl (meth)acrylate or diethylene glycol mono(meth)acrylate; (meth)acrylic acid; an aminoalkyl (meth)acrylate such as N-methylaminoethyl (meth)acrylate, N,N-dimethylaminoethyl (meth)acrylate or N,N-diethylaminoethyl (meth)acrylate; an alkoxyalkyl (meth)acrylate such as methoxyethyl (meth)acrylate, ethoxyethyl (meth)acrylate or methoxydiethylene glycol (meth)acrylate; styrene or derivatives thereof such as α-methylstyrene, o-, m- or p-methylstyrene, trifluoromethylstyrene, 2,2,2-trifluoroethylstyrene, 2,2,2-trifluoroethoxymethylstyrene, 2,2,3,3,4,4,4-heptafluorobutoxymethylstyrene, 3,3,3-trifluoropropoxymethylstyrene or 3,3,4,4,5,5,6,6,6-nonafluorohexanoxymethylstyrene; and the like.

The amount of the other copolymerizable monomers is not particularly limited so long as the objects of the present invention are not impaired, but preferably the amount is within the range of 1 to 20% by weight, especially 1 to 10% by weight, based on the total weight of the monomers used.

In the present invention, a special purpose monomer such as a polymerizable ultraviolet absorbing agent, a polymerizable dye or a polymerizable ultraviolet absorbing dye may also be used as a comonomer in order to impart a ultraviolet absorbing ability to the obtained lens material or in order to color the lens material.

Representative examples of the polymerizable ultraviolet absorbing agent are, for instance, a polymerizable benzophenone ultraviolet absorbing agent such as 2-hydroxy-4-acryloyloxybenzophenone or 2-hydroxy-4-methacryloyloxybenzophenone, a polymerizable benzotriazole ultraviolet absorbing agent such as 2-(2'-hydroxy-5'-acryloyloxyethoxy-3'-t-butylphenyl) -5-methyl-2H-benzotriazole or 2-(2'-hydroxy-5'-methacryloyloxyethoxy-3'-t-butylphenyl)-5-methyl-2H-benzotriazole, and the like. These compounds may be used alone or in admixture thereof.

Representative examples of the polymerizable dye are, for instance, a polymerizable azo dye such as 1-phenylazo-4-(meth)acryloyloxynaphthalene, 1-phenylazo-2-hydroxy-3-(meth)acryloyloxynaphthalene or 1-naphthylazo-2-hydroxy-3-(meth)acryloyloxynaphthalene; a polymerizable anthraquinone dye such as 1,5-bis(acryloylamino or methacryloylamino)-9,10-anthraquinone, 1-(4'-vinylbenzoyl-amido)-9,10-anthraquinone or 4-amino-1-(4'-vinylbenzoyl-amido)-9,10-anthraquinone; a polymerizable nitro dye such as o-nitroanilinomethyl (meth)acrylate; a polymerizable phthalocyanine dye such as (meth)acryloyl-modified tetraamino copper phthalocyanine or (meth)acryloyl-modified (dodecanoyl-modified tetraamino copper phthalocyanine); and the like. These compounds may be used alone or in admixture thereof.

Representative examples of the polymerizable ultraviolet absorbing dye are, for instance, a polymerizable benzophenone ultraviolet absorbing dye such as 2,4-dihydroxy-3-(p-styrenoazo)benzophenone or 2,4-dihydroxy-5-(p-styrenoazo)benzophenone; a polymerizable benzoic acid ultraviolet absorbing dye such as 2-hydroxy-4-(p-styrenoazo)phenyl benzoate; and the like. These compounds may be used alone or in admixture thereof.

The amount of the polymerizable ultraviolet absorbing agent, polymerizable dye and polymerizable ultraviolet absorbing dye is suitably selected. These special monomers are generally used in an amount of at least 0.005% by weight, preferably at least 0.01% by weight, based on the total weight of the monomers used, in order to sufficiently exhibit their effects. It is desirable to use these special monomers in an amount up to 5% by weight, preferably up to 1% by weight, based on the total weight of the monomers used, in order to prevent the obtained lens material from lowering the physical properties such as mechanical strength and oxygen permeability.

Preferably, a crosslinking agent is further used for the purpose of raising the hardness of the obtained copolymer to a level suitable for soft contact lens or for the purpose of improving the shape stability and transparency of the obtained copolymer. Known crosslinking agents can be used in the present invention.

Representative examples of the crosslinking agent are, for instance, 4-vinylbenzyl (meth)acrylate, 4-allylbenzyl (meth)acrylate, allyl (meth)acrylate, trimethylolpropane tri(meth)acrylate, ethylene glycol di(meth)acrylate, divinylbenzene, and the like. The crosslinking agents may be used alone or in admixture thereof. In particular, 4-vinylbenzyl acrylate and methacrylate are preferred, since they have a good copolymerizability with the monomers (A), (B) and (C) and a large effect of improving the transparency of the obtained copolymer.

The crosslinking agent is used in an amount of at least 0.1 part by weight, preferably at least 0.2 parts by weight, based on 100 parts by weight of the total of the monomers used, so as to sufficiently improve the hardness and the shape stability of the obtained water-absorptive soft contact lenses, and is used in an amount of at most 3 parts by weight, preferably at most 2 parts by weight, based on 100 parts by weight of the total of the monomers used, so as not to deteriorate the flexibility of the obtained soft contact lenses.

The copolymers suitable as water-absorptive soft contact lens materials according to the present invention are prepared by polymerizing in a usual manner a monomer mixture containing an N,N-dialkyl (meth)acrylate (A), an N-vinyllactam (B) and a bis(silicon-containing alkyl) fumarate (C), and optionally other hydrophilic or hydrophobic comonomers and a special purpose monomer such as a polymerizable ultraviolet absorbing agent, a polymerizable dye or a polymerizable ultraviolet absorbing dye, to which a crosslinking agent may be further added as occasion demands.

The polymerization is carried out, for instance, by a thermal polymerization process wherein a radical polymerization initiator is added to a monomer mixture, the monomer mixture is heated at a temperature of about 30° to about 60° C. for several hours to several tens of hours, and then the temperature is raised stepwise to about 120° to about 140° C. over several hours to several tens of hours to complete the polymerization, a photopolymerization process wherein a photopolymerization initiator is added to a monomer mixture and the polymerization is carried out by irradiating rays having a wavelength corresponding to absorption band for activation of the initiator, e.g. ultraviolet rays, to the monomer mixture, or a combination of the thermal polymerization process and the photopolymerization process. In case of adopting the thermal polymerization process, heating may be carried out in a constant temperature bath or a thermostatic chamber, or by irradiation of electromagnetic wave such as microwave. Also, the heating may be carried out stepwise. In the photopolymerization process, a sensitizer may be used.

The polymerization can be conducted in a usual manner such as bulk polymerization or solution polymerization.

Typical examples of the radical polymerization initiator are, for instance, azobisisobutyronitrile, azobisdimethylvaleronitrile, benzoyl peroxide, t-butyl hydroperoxide, cumene peroxide, and the like.

Typical examples of the photo polymerization initiator are, for instance, a benzoin photoinitiator such as methyl orthobenzoylbenzoate, methyl benzoylformate, benzoin methyl ether, benzoin ethyl ether, benzoin isopropyl ether, benzoin isobutyl ether or benzoin n-butyl ether; a phenone photoinitiator such as 2-hydroxy-2-methyl-1-phenylpropane-1-one or p-isopropyl-α-hydroxy-isobutylphenone; 1-hydroxycyclohexyl phenyl ketone; 1-phenyl-1,2-propanedione-2-(o-ethoxycarbonyl)oxime; a thioxanthone photoinitiator such as 2-chlorothioxanthone or 2-methylthioxanthone; 2-ethylanthraquinone; benzophenone acrylate; benzophenone; benzil; and the like.

The amount of the polymerization initiator is from about 0.001 to about 5 parts by weight, preferably about 0.01 to about 2 parts by weight, based on 100 parts by weight of the total of the monomers used.

The thus obtained copolymer comprising the components (A), (B) and (C) according to the present invention may be used alone as a water-absorptive soft contact lens material, or may be used in combination with a minor amount of other polymers, e.g., those known to be suitable as a contact lens material, particularly as a water-absorptive soft contact lens material, so long as the contact lenses prepared therefrom have excellent transparency, flexibility and oxygen permeability independent of water content, and a high mechanical strength. In case of using the copolymer according to the present invention in combination with other polymers, the content of the copolymer is at least 50% by weight, preferably at least 60% by weight. The copolymer may be blended with other polymers in a usual manner, e.g., dry blending or blending of polymer solutions followed by removal of solvents, to give contact lens materials.

Water-absorptive soft contact lenses are prepared by forming the contact lens material of the present invention to a contact lens shape. Usual methods are applicable to the formation of the lens material of the invention. For example, adoptable are a mechanical processing method wherein the polymerization of a monomer mixture is carried out in a suitable mold or container to give a copolymer in the form of a rod, a block or a board and the thus obtained lens material is subjected to mechanical processing such as cutting and polishing to give contact lenses having a desired shape; a mold method wherein the polymerization of a monomer mixture is carried out in a mold having a cavity corresponding to a desired contact lens shape, and the obtained product having a contact lens shape is subjected to a finishing processing as occasion demands; a combined method of the mechanical processing method and the mold method wherein the polymerization of a monomer mixture is carried out in a mold having a shape corresponding to at least one surface of a desired contact lens shape, and the obtained product is subjected to a mechanical processing to form the other surface of the contact lens; a spin casting method; and the like.

The thus obtained shaped articles (nonhydrated contact lenses) are then hydrated by immersing them in distilled water, physiological saline, an aqueous solution whose osmotic pressure and pH are properly adjusted, and the like to give water-absorptive soft contact lenses having, for instance, a water content of about 20 to about 50% by weight.

The water-absorptive contact lens materials of the present invention have, to say nothing of excellent transparency and flexibility, an excellent oxygen permeability without depending on the water content, and have a high mechanical strength. Therefore, they can provide high oxygen permeable water-absorptive soft contact lenses.

The present invention is more specifically described and explained by means of the following Examples in which all parts and % are by weight unless otherwise noted. It is to be understood that the present invention is not limited to these Examples.

EXAMPLE 1

To a monomer mixture of 35 parts of N,N-dimethylacrylamide (hereinafter referred to as "DMAA"), 25 parts of N-vinylpyrrolidone (hereinafter referred to as "NYP") and 40 parts of bis[tris(trimethylsiloxy)silylpropyl] fumarate (hereinafter referred to as "BS4F") were added 1.3 parts of 4-vinylbenzyl methacrylate (hereinafter referred to as "VBMA") as a crosslinking agent and 0.1 part of azobisisobutyronitrile as a polymerization initiator, respectively, based on 100 parts by weight of the monomer mixture. They were mixed and placed in a polypropylene test tube having an inner diameter of 20 mm. The polymerization was carried out in the test tube stepwise at 40° C. for 20 hours, at 50° C. for 8 hours and finally at 100° C. for 1 hour to give a copolymer in the form of a rod.

The copolymer was transparent and hard. Also, the copolymer was machinable and could be processed into contact lenses. The contact lenses were immersed into distilled water to hydrate them. The hydrated contact lenses had a flexibility suitable for soft contact lens.

The copolymer in the form of a nonhydrated rod was subjected to cutting and polishing processing to give test specimens having a prescribed thickness and a diameter of about 13 mm. The test specimens were hydrated with distilled water and the physical properties thereof were measured according to the following methods.

The results are shown in Table 1.

(A) Appearance (transparency)

A nonhydrated test specimen (dry state) and a hydrated test specimen (hydrated state) each having a thickness of about 2 mm were visually observed, and the transparency was estimated according to the following criteria.

A: Colorless and transparent
B: Slightly cloudy
C: Remarkably cloudy and opaque (B) Water content Water content of the test specimen having a thickness of about 2 mm at 35° C. was determined according to the following equation.

$$\text{Water content } (\%) = [(W - W_0)/W] \times 100$$

wherein W is the weight (g) of test specimen hydrated in the equilibrium state, and Wo is the weight (g) of test specimen in the dry state after drying the hydrated specimen in a desiccator.

(C) Coefficient of oxygen permeability ($Dk_{0.2}$)

The oxygen permeability coefficient of test specimens having a thickness of about 0.2 mm was measured in physiological saline at 35° C. using a Seikaken-type film-oxygen gas permeameter made by Rikaseiki Kogyo Kabushiki Kaisha.

The unit of the oxygen permeability coefficient is (cm$^2$/sec)·(ml O$_2$/ml·mmHg).

(D) Hardness

Test specimens having a thickness of about 3.5 mm were immersed in distilled water for two weeks, and the JIS A hardness of the hydrated specimens was measured at 25° C. according to JIS K 6301, Physical Testing Methods for Vulcanized Rubber, Durometer Hardness Test (Type A).

(E) Needle penetration strength (i) Needle penetration load

Using a needle penetration tester, a needle having a diameter of 1/16 inch was put on the center of test specimen, and the needle penetration load (g) at breaking of the specimen was measured. The value shown in Table 1 is a value when the thickness of the specimen is converted into about 0.2 mm.

(ii) Elongation

The elongation (%) at breaking of the test specimen was measured when measuring the above needle penetration load (i).

EXAMPLES 2 to 11 and
Comparative Examples 1 to 3

Rod-like copolymers were prepared in the same manner as in Example 1 except that the proportions of the monomers and crosslinking agent were changed as shown in Table 1.

The copolymers obtained in Examples 2 to 11 were all transparent and hard, and they were machinable and could be processed into contact lenses. Also, the contact lenses hydrated by immersing in distilled water had a flexibility suitable for soft contact lens.

Test specimens were prepared from the obtained copolymers, hydrated and subjected to the measurement of physical properties in the same manner as in Example 1.

The results are shown in Table 1.

Since the test specimens obtained in Comparative Examples 1 to 3 were completely cloudy over the entire in both the dry and hydrated states (estimation rating of transparency: C) and were apparently not usable as contact lenses, the other physical properties were not measured.

TABLE 1

| | Composition (part) | | | | Properties | | | | Needle penetration strength | |
|---|---|---|---|---|---|---|---|---|---|---|
| | Monomers | | | Crosslinking agent | Transparency | | Water content (%) | Oxygen permeability ($Dk_{0.2}$) | Hardness | Needle penetration load (g) | Elongation (%) |
| | DMAA | NVP | BS4F | VBMA | Dry state | Hydrated state | | | | | |
| Ex. 1 | 35 | 25 | 40 | 1.3 | A | A | 48.4 | 53 × 10$^{-11}$ | 50 | 217 | 58 |
| Ex. 2 | 32.2 | 22.8 | 45 | 0.6 | A | A | 49.2 | 59 × 10$^{-11}$ | 35 | 168 | 97 |
| Ex. 3 | 29.2 | 20.8 | 50 | 0.6 | A | A | 43.7 | 64 × 10$^{-11}$ | 36 | 207 | 114 |
| Ex. 4 | 26.3 | 18.7 | 55 | 0.5 | A | A | 36.9 | 78 × 10$^{-11}$ | 36 | 214 | 94 |
| Ex. 5 | 23.3 | 16.7 | 60 | 0.5 | A | A | 30.3 | 82 × 10$^{-11}$ | 35 | 247 | 115 |
| Ex. 6 | 20.4 | 14.6 | 65 | 0.4 | A | A | 22.3 | 89 × 10$^{-11}$ | 36 | 295 | 112 |
| Ex. 7 | 27.5 | 27.5 | 45 | 0.6 | A | A | 48.4 | 57 × 10$^{-11}$ | 40 | 161 | 71 |
| Ex. 8 | 25 | 25 | 50 | 0.6 | A | A | 42.6 | 66 × 10$^{-11}$ | 40 | 203 | 95 |
| Ex. 9 | 22.5 | 22.5 | 55 | 0.5 | A | A | 37.0 | 71 × 10$^{-11}$ | 39 | 253 | 104 |
| Ex. 10 | 20 | 20 | 60 | 0.5 | A | A | 30.4 | 85 × 10$^{-11}$ | 39 | 271 | 98 |
| Ex. 11 | 17.5 | 17.5 | 65 | 0.4 | A | A | 22.8 | 90 × 10$^{-11}$ | 40 | 311 | 107 |
| Com. Ex. 1 | 57.2 | 2.8 | 40 | 1.3 | C | C | — | — | — | — | — |
| Com. Ex. 2 | 54.1 | 5.9 | 40 | 1.3 | C | C | — | — | — | — | — |
| Com. Ex. 3 | 43.1 | 16.9 | 40 | 1.3 | C | C | — | — | — | — | — |

Comparative Examples 4 and 5

The appearance, water content, coefficient of oxygen permeability and needle penetration strength of N-vinylpyrrolidone/methyl methacrylate copolymer known as a lens material having a high water content (Com. Ex. 4) and 2-hydroxyethyl methacrylate/2-hydroxybutyl methacrylate copolymer known as a lens material having a low water content (Com. Ex. 5) were measured in the same manner as in Example 1.

The vinylpyrrolidone copolymer of Con. Ex. 4 had a rating A with respect to appearance, a water content of 75%, an oxygen permeability coefficient of $41 \times 10^{-11}$ (cm$^2$/sec)·(ml O$_2$/ml·mmHg), a needle penetration load of 72 g and an elongation of 69%.

The hydroxymethacrylate copolymer of Com. Ex. 5 had a rating A with respect to appearance, a water content of 37%, an oxygen permeability coefficient of $10 \times 10^{-11}$ (cm2/sec)·(ml O$_2$/ml·mmHg), a needle penetration load of 120 g and an elongation of 116%.

From the results shown in Table 1, it is understood that the copolymers obtained in Examples 1 to 11 have an excellent transparency in both the dry and hydrated states.

From the results shown in Table 1 and the results of Comparative Examples 4 and 5, it is understood that the copolymers obtained in Examples 1 to 11 exhibit an excellent oxygen permeability without depending on the water content, and have a high mechanical strength, and that adequate water content and hardness are obtained by adjusting the proportions of the monomers and accordingly water-absorptive soft contact lenses according to the purposes can be provided.

In contrast, it would be understood that in case of the vinylpyrrolidone copolymer of Com. Ex. 4, the mechanical strength would be lowered if the water content is raised in order to raise the oxygen permeability, and that in case of the hydroxymethacrylate copolymer of Com. Ex. 5, the oxygen permeability would be lowered if the water content is lowered in order to retain the mechanical strength.

In addition to the ingredients used in the Examples, other ingredients can be used in the Examples as set forth in the specification to obtain substantially the same results.

What we claim is:

1. A material suitable for the production of water-absorptive soft contact lenses comprising a copolymer prepared by the polymerization of the monomer mixture comprising (A) 15 to 40% by weight of an N, N-dialkyl acrylamide or methacrylamide, (B) 10 to 30% by weight of an N-vinyllactam, and (C) 30 to 70% by weight of a bis(silicon-containing alkyl) fumarate, wherein the ratio of said component (A) to said component (B) is from about 0.7 to about 1.6 by weight.

2. The material of claim 1, wherein said bis(silicon-containing alkyl) fumarate (C) is a compound of the formula (I):

$$\begin{array}{c} R^1 \quad\quad\quad\quad\quad\quad\quad O \\ | \quad\quad\quad\quad\quad\quad\quad\quad || \\ R^2-Si+CH_2\!\!\rightarrow_m\!\!O-C-CH \quad\quad R^4 \\ | \quad\quad\quad\quad\quad\quad\quad\quad\quad\quad || \quad\quad | \\ R^3 \quad\quad\quad\quad\quad HC-C-O+CH_2\!\!\rightarrow_n\!\!Si-R^5 \\ \quad\quad\quad\quad\quad\quad\quad || \quad\quad | \\ \quad\quad\quad\quad\quad\quad\quad O \quad\quad R^6 \end{array}$$

wherein $R^1$ to $R^6$ are independently methyl group or trimethylsiloxy group of the formula:

$$\begin{array}{c} CH_3 \\ | \\ CH_3-Si-O- \\ | \\ CH_3 \end{array}$$

and m and n are independently an integer of 1 to 3.

3. The material of claim 1, wherein said bis(silicon-containing alkyl) fumarate is bis[tris(trimethylsiloxy)silylpropyl] fumarate.

4. The material of claim 1, wherein said N,N-dialkyl acrylamide or methacrylamide has an alkyl group having 1 to 3 carbon atoms.

5. The material of claim 1, wherein said N-vinyllactam (B) is at least one member selected from the group consisting of N-vinylpyrrolidone, N-vinyl-3-methylpyrrolidone, N-vinylcaprolactam and N-vinylpiperidone.

6. The material of claim 1, wherein said monomer mixture contains 0.1 to 3 parts by weight of a crosslinking agent per 100 parts by weight of said monomer mixture.

7. The material of claim 1, wherein said monomer mixture contains 0 to 20% by weight of a hydrophobic or hydrophilic monomer copolymerizable with said components (A), (B) and (C).

8. The material of claim 7, wherein said hydrophobic monomer is at least one member selected from the group consisting of an alkyl acrylate or methacrylate, a fluoroalkyl acrylate or methacrylate, styrene and styrene derivatives.

9. The material of claim 1, which contains at least 50% by weight of said copolymer.

10. A water-absorptive soft contact lens comprising a copolymer prepared by the polymerization of a monomer mixture comprising (A) 15 to 40% by weight of an N,N-dialkyl acrylamide or methacrylamide, (3) 10 to 30% by weight of an N-vinyllactam, and (C) 30 to 70% by weight of a bis(silicon-containing alkyl) fumarate, wherein the ratio of said component (A) to said component (B) is from about 0.7 to about 1.6 by weight.

11. The contact lens of claim 10, wherein said bis(silicon-containing alkyl) fumarate (C) is a compound of the formula (I):

$$\begin{array}{c} R^1 \quad\quad\quad\quad\quad\quad\quad O \\ | \quad\quad\quad\quad\quad\quad\quad\quad || \\ R^2-Si+CH_2\!\!\rightarrow_m\!\!O-C-CH \quad\quad R^4 \\ | \quad\quad\quad\quad\quad\quad\quad\quad\quad\quad || \quad\quad | \\ R^3 \quad\quad\quad\quad\quad HC-C-O+CH_2\!\!\rightarrow_n\!\!Si-R^5 \\ \quad\quad\quad\quad\quad\quad\quad || \quad\quad | \\ \quad\quad\quad\quad\quad\quad\quad O \quad\quad R^6 \end{array}$$

wherein $R^1$ to $R^6$ are independently methyl group or trimethylsiloxy group of the formula:

$$\begin{array}{c} CH_3 \\ | \\ CH_3-Si-O- \\ | \\ CH_3 \end{array}$$

and m and n are independently an integer of 1 to 3.

12. The contact lens of claim 10, wherein said bis(silicon-containing alkyl) fumarate is bis[tris(trimethylsiloxy)silylpropyl] fumarate.

13. The contact lens of claim 10, wherein said N,N-dialkyl acrylamide or methacrylamide has an alkyl group having 1 to 3 carbon atoms.

14. The contact lens of claim 10, wherein said N-vinyllactam (B) is at least one member selected from the group consisting of N-vinylpyrrolidone, N-vinyl-3-methylpyrrolidone, N-vinylcaprolactam and N-vinylpiperidone.

15. The contact lens of claim 10, wherein said monomer mixture contains 0.1 to 3 parts by weight of a crosslinking agent per 100 parts by weight of said monomer mixture.

16. The contact lens of claim 10, wherein said monomer mixture contains 0 to 20% by weight of a hydrophobic or hydrophilic monomer copolymerizable with said components (A), (B) and (C).

17. The contact lens of claim 16, wherein said hydrophobic monomer is at least one member selected from the group consisting of an alkyl acrylate or methacrylate, a fluoroalkyl acrylate or methacrylate, styrene and styrene derivatives.

* * * * *